A. F. ROCKWELL.
VEHICLE BODY SUPPORT.
APPLICATION FILED MAR. 19, 1906.
962,256.
Patented June 21, 1910.
2 SHEETS—SHEET 1.
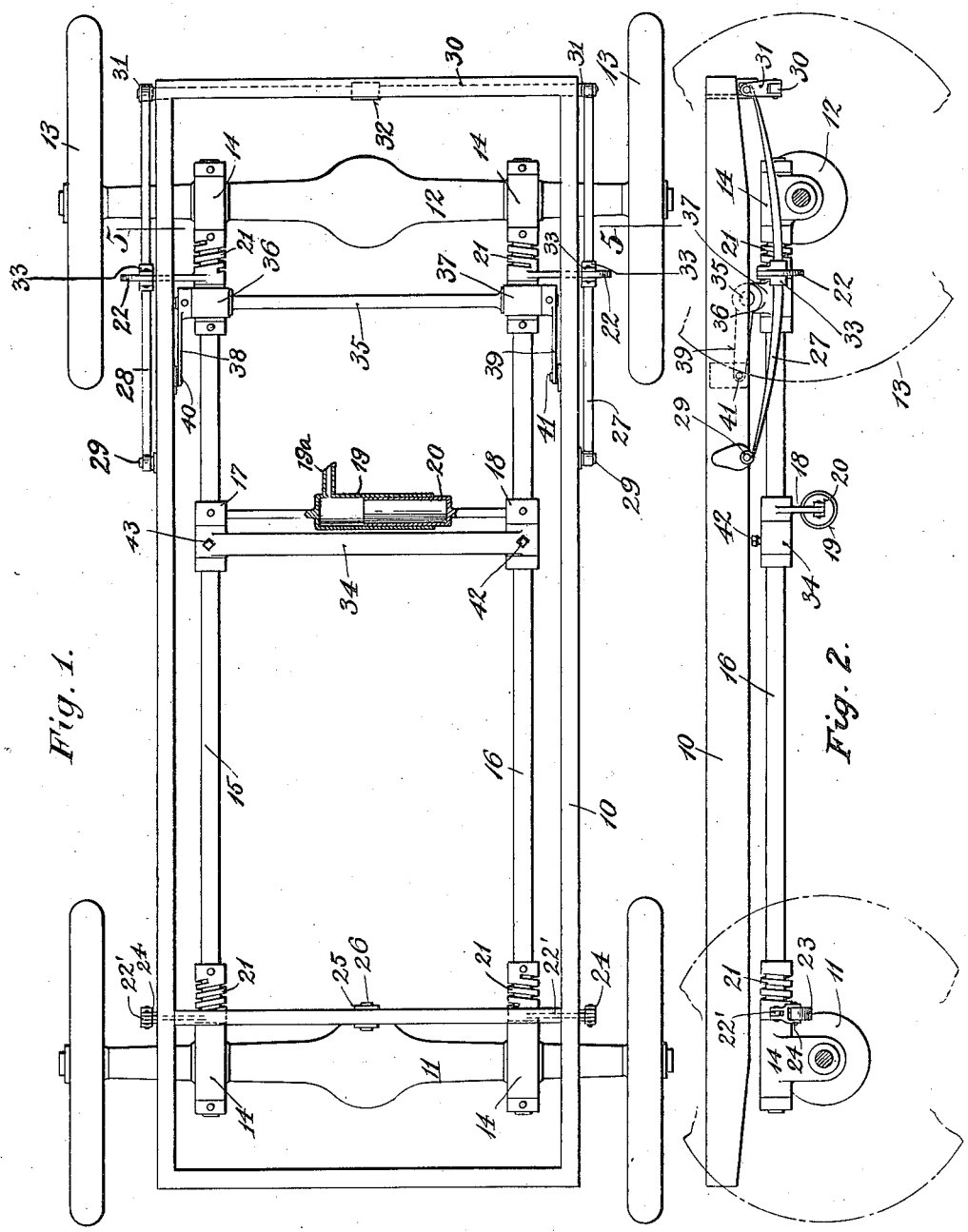
WITNESSES:
INVENTOR.
A. F. Rockwell,
BY
his ATTORNEY.

A. F. ROCKWELL.
VEHICLE BODY SUPPORT.
APPLICATION FILED MAR. 19, 1906.
962,256.
Patented June 21, 1910.
2 SHEETS—SHEET 2.
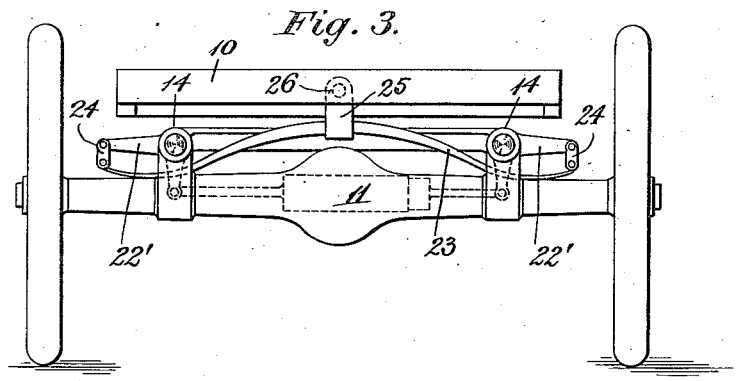
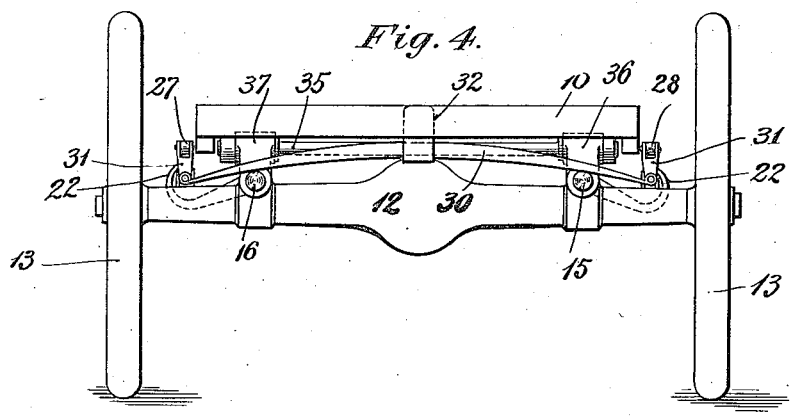
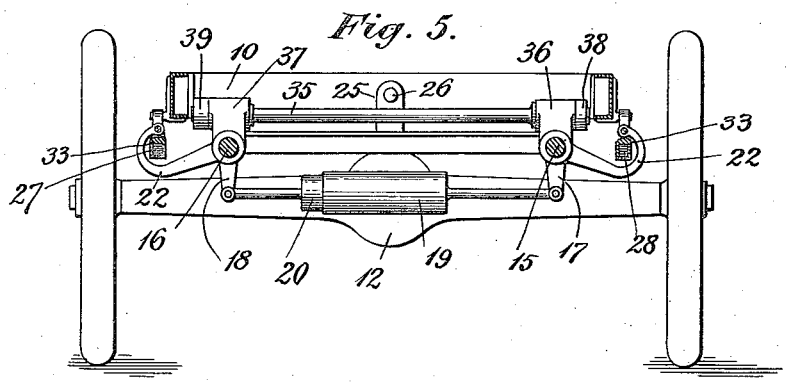
WITNESSES:
Chas. F. Schmelz
B. F. Funk
INVENTOR.
A. F. Rockwell,
BY Gales P. Moore
his ATTORNEYS

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

VEHICLE-BODY SUPPORT.

962,256. Specification of Letters Patent. Patented June 21, 1910.

Application filed March 19, 1906. Serial No. 306,836.

*To all whom it may concern:*

Be it known that I, ALBERT F. ROCKWELL, a citizen of the United States, residing at Bristol, county of Hartford, State of Connecticut, have invented a certain new and useful Vehicle-Body Support, of which the following is a full, clear, and exact description, such as will enable others skilled in the art to which it appertains to make and use the same, reference being had to the accompanying drawings, forming part of this specification.

This invention relates to means for resiliently supporting a body upon a base, and in the illustrated embodiment of the invention I have shown it as including a vehicle body frame supported by the running-gear of a vehicle.

One of the objects of my invention is to provide means whereby the shocks and jars incident to the travel of the vehicle wheels over an irregular surface will not be communicated to the vehicle body.

Another object of the invention is to provide means to insure the comfort of the occupants of a vehicle, in doing which I aim to normally maintain the vehicle body approximately parallel with the running-gear irrespective of the location of the load on the body.

Another object of the invention is to provide means for absorbing the shocks and jars to which the vehicle might be subjected in passing over inequalities on the road, and to facilitate the resilient actions of the supporting devices for the body.

Other objects and advantages as well as the novel details of construction of this invention will be specifically set forth hereinafter, it being understood that changes in form, proportion and minor details of construction may be resorted to without departing from the spirit of the invention or sacrificing any of the advantages thereof.

In the drawings: Figure 1 is a top plan view of a vehicle body frame and a running frame of a vehicle embodying my invention; Fig. 2 is a side elevation thereof; Fig. 3 is an end view of the same; Fig. 4 is a rear view; and Fig. 5 is a sectional view on the line 5—5 of Fig. 1.

The reference numerals 11 and 12 designate axle casings which constitute parts of the base frame and in which are suitably journaled the front and rear axles respectively. The said axles are connected in any suitable manner to the traction wheels 13 of the vehicle which they drive. Journaled in suitable bearings 14 on the respective axles are longitudinally disposed parallel rocking elements illustrated as shafts 15 and 16. These rock shafts are provided with depending rock arms 17 and 18 respectively, which are connected to a cushioning device illustrated as comprising two oppositely movable co-acting elements 19 and 20, between which may be introduced a suitable fluid cushion, such as air. The air may be introduced between the elements through the inlet port 19ª from any suitable source of supply. The casings 11 and 12 together with the longitudinally disposed rock shafts 15 and 16 constitute practically a running frame, and as has been heretofore stated, it is one of the objects of my invention to efficiently provide a resilient support for the body which is superposed above said running frame. The body frame is supported on what might properly be termed a three point support, in that connections are made at two points near one end of the frame, while a single connection is made at the opposite end of the frame.

The mechanism for providing the suspension or support is capable of various modifications, but it is herein shown as including springs 21, one of these being shown near each end of each rock shaft. The form of torsional spring illustrated in the drawings comprises a coil fixed at one end to the rock shaft and provided at the other with an outwardly disposed arm 22 or 22'. The arms at one end of the running frame, for example the front end, are connected to a transverse leaf or semi-elliptical spring 23, the ends of which may be connected to the arms 22' in any suitable manner, as for example by the links 24. The intermediate portion (preferably the center) of the spring 23 is provided with an upstanding lug 25 pivotally connected to the body frame as at 26. The arms 22 near the opposite end of the frame are shown as being connected to longitudinally disposed leaf or semi-elliptical springs 27 and 28 respectively. These springs are connected to the arms near the center of said springs, and one end of each spring is shown as being connected directly to the body frame, as at 29, while the opposite end of each spring is connected to the ends of a transversely arranged semi-elliptical spring 30, by the links 31. The spring 30 may be suspended or hung from the body frame 10 by the hanger 32 carried by said frame. The arms 22 are shown as being curved outwardly and then inwardly to engage clips 33 which engage said springs 27 and 28, which compose the connections between said body frame and said arms at one end. The arms near the other end of said frame project straight outwardly, being connected to the transverse spring 23 which constitutes the connection between the body and said latter named arms. In order to prevent outward spread of said rock shafts 15 and 16, I have provided a tie-bar 34, the ends of which engage the respective rock shafts, which are movable therein.

In order to assist in maintaining parallelism between the body frame and the running-gear under normal conditions, I may utilize a suitable means for causing the entire body to be depressed when weight is applied to any one part of the vehicle body. A simple form of doing this may include a transverse rock shaft 35 journaled in bearings 36 and 37 supported upon said rock shafts 15 and 16 at any suitable point, but in this instance near one end of the vehicle. The rock shaft 35 is provided with right-angularly disposed fixed arms 38 and 39, which are in pivotal connection with the body running frame at 40 and 41. Therefore it follows that if weight is applied to the vehicle body frame 10, so as to depress either of the arms 38 or 39, the other arm would be carried with it and pull down the opposite side of the frame. If on the other hand either of the shafts 15 or 16 is rocked, the other shaft must necessarily rock, and thereby tend to assist in maintaining the parallelism between the body frame and the running-gear. Due to the peculiar manner in which the several coöperating devices are disposed, a certain amount of up and down movement of the wheels will be permitted without communicating this movement to the body frame, which will be maintained in practically a horizontal plane at all times.

By providing the combination of a fluid cushion, a torsional spring and the leaf springs, I aim to provide a highly resilient support for the body. The effectiveness of such a combination as the one above given will be readily understood. One advantage of such a combination is that by providing the fluid cushion, torsional spring and leaf spring, the differences in their resiliency will tend to absorb shocks on the road and prevent said shocks being communicated to the body, and further, any tendency of any spring or set of springs to accelerate any movement of the body will be counteracted by either or both of the other springs. I am aware, however, that a mechanical spring, such as a coil spring, for example, might be substituted for the air cushion if desired. Although for general use I prefer to have the shafts 15 and 16 rock, I may find under certain conditions that it is desirable to prevent said shafts from rocking, and I make provision for holding said shafts rigid, as for example, by inserting pins 42 and 43 through the ends of the tie-bar 34 and the said shafts, these pins being removable, so that they may be readily taken out when desired.

My co-pending application Serial No. 259,860 includes in its subject-matter a structure having a base, rockable elements upon said base, arms upon said rockable elements, a body connected to said arms and movable toward and away from said base, other arms upon said rockable elements, and fluid cushion mechanism between said last mentioned arms, such structure permitting resilient movement between said base and body and preserving parallelism between them. Therefore, I do not herein make claim to said mechanism *per se*.

What I claim is:—

1. The combination with a vehicle running gear, of rocking elements carried by the running gear, torsional springs coiled about the rocking elements and having movements independent of the movements of the rocking elements, one part of each torsional spring being fixed to a rocking element, and a body frame spaced from the rocking elements and connected to the torsional springs.

2. The combination with a base frame having rockable elements, of a cushion connected to said rockable elements to resiliently resist movement thereof, torsional springs coiled around said rockable elements, arms projecting from said springs and rigid therewith, a body frame, and connections between said arms and said body frame.

3. The combination of two frames, one of which is provided with rocking elements, a fluid cushion for resisting the movement of said rocking elements, torsional springs coiled on said rocking elements, leaf springs connected to the second frame, and connections between the leaf springs and the torsional springs.

4. The combination with a base frame, of rocking elements on said base frame, a body frame spaced from said rocking elements, and rock arms terminating in coiled springs carried by the rocking elements and connected to the body frame.

5. The combination with a supporting base and a body, of connection between said base and body and including rockable elements, a spring device opposing the movement of said rockable elements, and means whereby said rockable elements can be locked against rocking.

6. The combination with a supporting base and a body, of connection between said base and body and including rockable elements, a tie-bar between said rockable elements, and means for locking said rockable elements to said tie-bar to prevent rocking.

In testimony whereof, I hereunto affix my signature, in the presence of two witnesses.

ALBERT F. ROCKWELL.

Witnesses:
B. F. FUNK,
ETHEL L. TOLAU.